United States Patent
Ramsauer

(10) Patent No.: US 10,125,913 B2
(45) Date of Patent: Nov. 13, 2018

(54) ARTICULATED LEVELING FOOT FOR MACHINES OR DEVICES

(71) Applicant: Dieter Ramsauer, Schwelm (DE)

(72) Inventor: Dieter Ramsauer, Schwelm (DE)

( * ) Notice: Subject to any disclaimer, the term of this patent is extended or adjusted under 35 U.S.C. 154(b) by 0 days.

(21) Appl. No.: 15/503,829

(22) PCT Filed: Aug. 20, 2015

(86) PCT No.: PCT/EP2015/001705
§ 371 (c)(1),
(2) Date: Feb. 14, 2017

(87) PCT Pub. No.: WO2016/030006
PCT Pub. Date: Mar. 3, 2016

(65) Prior Publication Data
US 2017/0276288 A1  Sep. 28, 2017

(30) Foreign Application Priority Data
Aug. 26, 2014 (DE) .................... 20 2014 006 983 U

(51) Int. Cl.
*F16C 11/06* (2006.01)
*F16M 7/00* (2006.01)
(Continued)

(52) U.S. Cl.
CPC ............... *F16M 7/00* (2013.01); *A47B 91/10* (2013.01); *F16C 11/0609* (2013.01); *A47B 91/066* (2013.01)

(58) Field of Classification Search
CPC ........ F16M 11/14; F16M 11/06; F16M 11/24; F16M 7/00; F16C 11/0609; F16C 35/08;
(Continued)

(56) References Cited

U.S. PATENT DOCUMENTS 331,460 A  12/1885  Esuckow
2003/0146355 A1  8/2003  Burr
(Continued)

FOREIGN PATENT DOCUMENTS

CN  201021751  2/2008
CN  101715527  5/2010
(Continued)

OTHER PUBLICATIONS www.fath.net, Fath GmbH Components, 2014, pp. 24, 33, 32, 35, 48 and 49.

*Primary Examiner* — Nkeisha Smith
(74) *Attorney, Agent, or Firm* — Haug Partners LLP

(57) ABSTRACT

An articulated adjusting foot including a base plate having a receiving space on the side of the plate remote of the floor and which has the geometry of a partial ball, preferably with dimensions slightly exceeding a hemisphere, further having a threaded rod which has at its one end a partial ball that can be inserted into the receiving space. The partial ball of the threaded rod can be fittingly received in the receiving space. The threaded rod is a conventional screw bolt with hexagon head. The ball, which can be inserted into the receiving space, is formed of two parts, e.g., halves (half-shells), which can be inserted one into the other and which enclose the hexagon head in a torsionally rigid manner. The geometry of the partial balls of the threaded rod exceeds that of the receiving space axially in direction of the threaded shaft.

16 Claims, 7 Drawing Sheets

(51) Int. Cl.
*A47B 91/10* (2006.01)
*A47B 91/06* (2006.01)

(58) Field of Classification Search
CPC ....... B23P 17/00; A47B 91/10; A47B 91/066; A47B 91/024; A47B 91/022; A47B 91/028; A47B 2220/003
USPC ......... 248/188.4, 188.2, 188.8, 188.9, 188.7, 248/677, 181.2, 678, 674; 182/201, 204, 182/205, 111
See application file for complete search history.

(56) References Cited

U.S. PATENT DOCUMENTS

| | | | |
|---|---|---|---|
| 2004/0262467 | A1 | 12/2004 | Burr |
| 2016/0076583 | A1* | 3/2016 | Karai .................. F16M 11/125 248/278.1 |

FOREIGN PATENT DOCUMENTS

| | | |
|---|---|---|
| CN | 202188278 | 4/2012 |
| EP | 1 124 086 | 8/2001 |
| EP | 1124086 | 8/2001 |
| JP | H11336741 | 12/1999 |
| WO | WO 2008/135044 | 11/2008 |

* cited by examiner

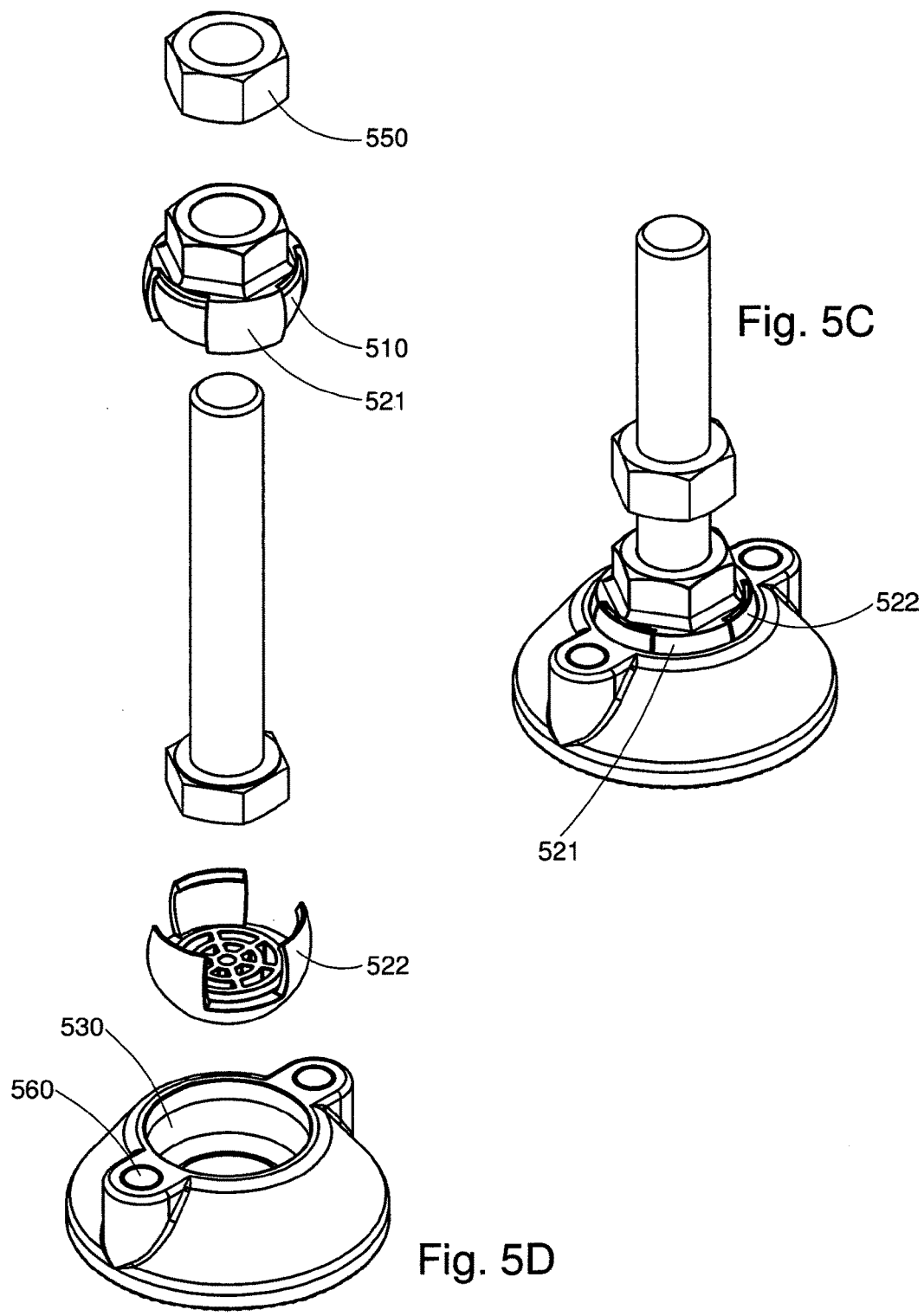

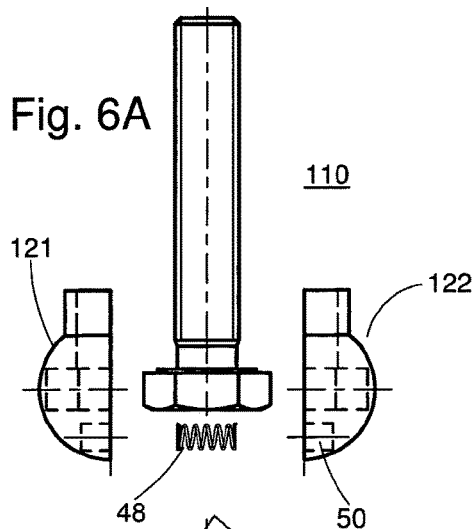
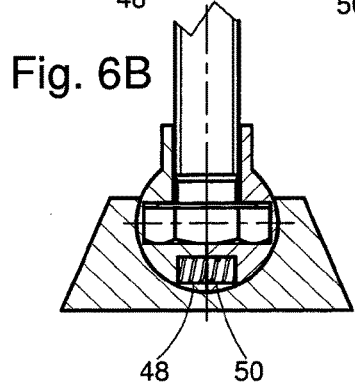
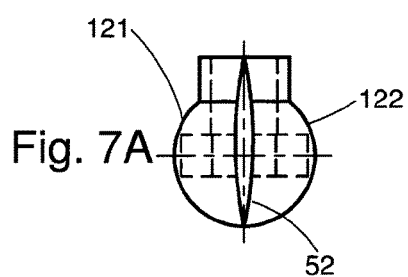
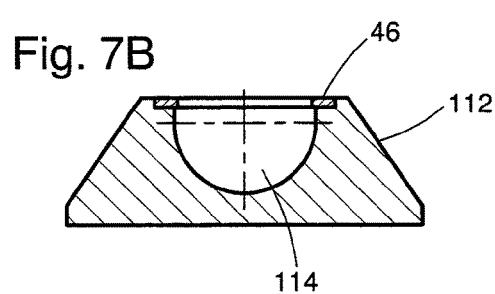
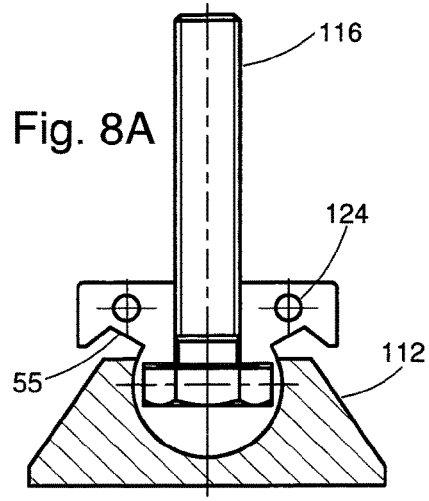
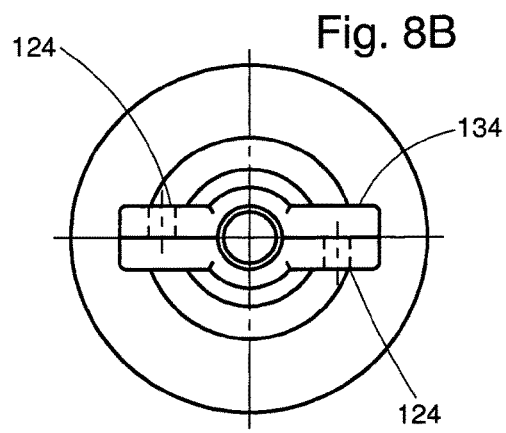
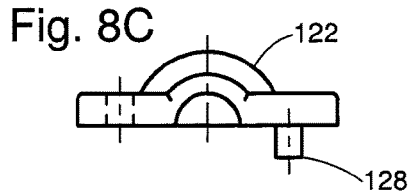

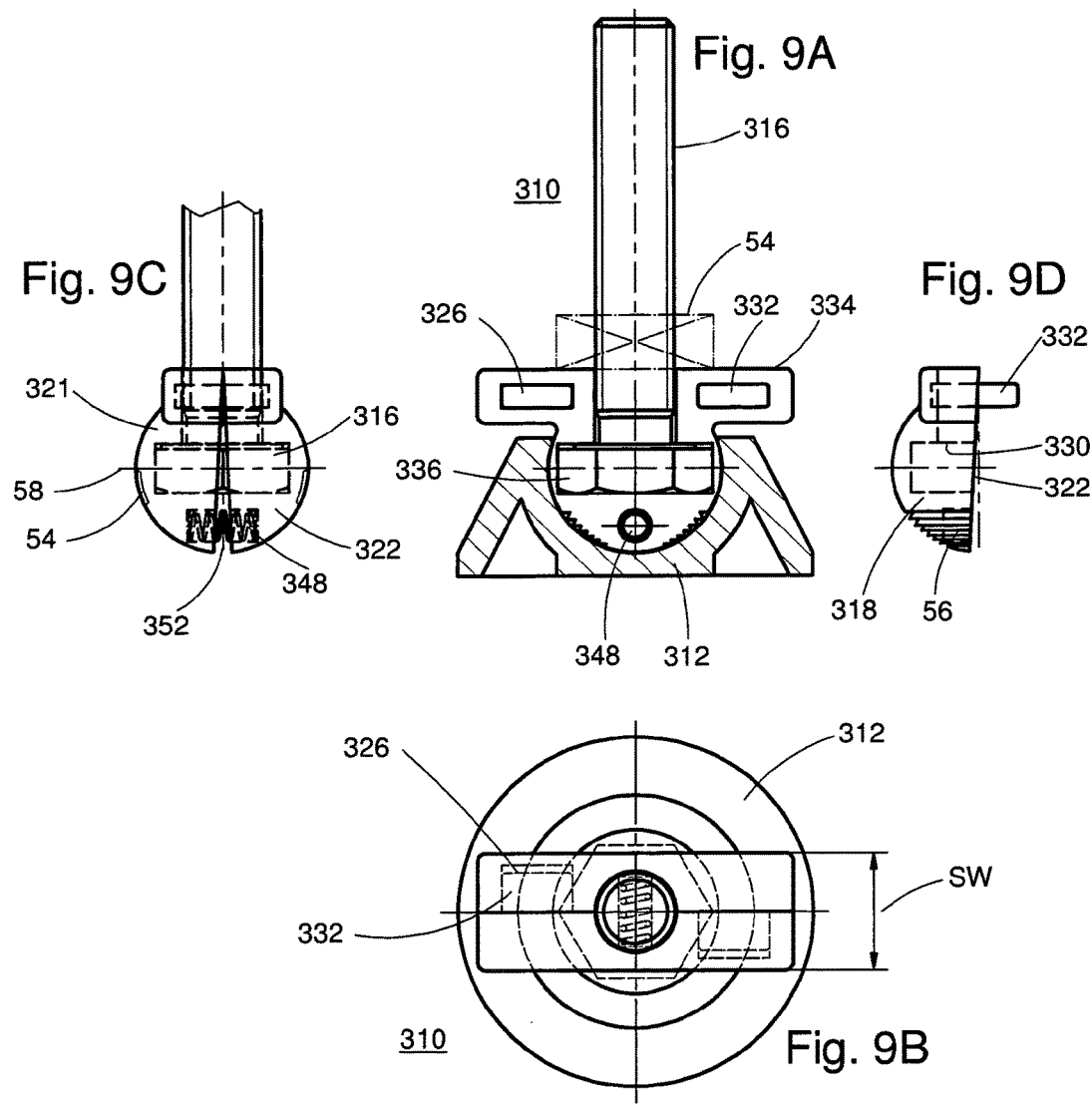

ARTICULATED LEVELING FOOT FOR MACHINES OR DEVICES

The present application claims priority from German Patent Application No. 10 2015 121410.5 filed on Dec. 9, 2015, the disclosure of which is incorporated herein by reference in its entirety.

FIELD OF THE INVENTION

It is noted that citation or identification of any document in this application is not an admission that such document is available as prior art to the present invention.

The invention is directed to an adjusting foot for machinery or devices, comprising a base plate which has a receiving space on the side of the plate remote of the floor and which has the geometry of a partial ball, preferably with dimensions not exceeding, or only slightly exceeding, a hemisphere, further having a threaded rod which has at one of its ends a partial ball which can be inserted into the receiving space, the partial ball of the threaded rod can be fittingly received in the receiving space, the geometry of the partial ball of the threaded rod appreciably exceeds that of the receiving space, and the hemisphere is accordingly retained in the open space by projections or recesses.

An adjusting foot of this kind is already known from a brochure of Fath GmbH Components, pages 24, 33, 32, 35, 48 and 49. Reference is also made to WO 2008/135044 A1.

Articulated feet in the prior art make use of threaded rods with balls which are very expensive to produce. They are usually produced from hexagonal material because of the possibility of adjusting with a wrench. A further drawback consists in that the diameter of the ball may not be greater than the diameter of the wrench opening, and the supporting surface is accordingly small and also has a female thread as can be seen from Sheet 49 of the reference. A further disadvantage consists in that the diameter of the ball can be very small. On the other hand, a hexagon wrench must correspond to both and the projected surface is therefore small and limits the supporting capacity.

As can further be seen from the prior art, attempts have been made to find another solution using hexagon screws. However, this solution also has substantial drawbacks owing to the reworking of the hexagon screws and the use of additional parts.

SUMMARY OF THE INVENTION

It is the object of the invention to provide an adjusting foot screw which has a greater carrying capacity and is cheaper to produce than the above-mentioned prior art arrangement.

This object is met in that the threaded rod is a conventional screw bolt with hexagon head, and in that the ball which can be inserted into the ball receiving space is formed of at least two partial shells or shell halves which can be inserted one into the other and which enclose the hexagon head in a torsionally rigid manner.

Thus the underlying idea is to use a standard hexagon screw or the like requiring no work. The hexagon head of the screw has a large surface. When this surface terminates with two partial shells or half-shells to form a ball, it has a relatively large diameter and, owing to the enormous projected surface, a high carrying capacity. Since the threaded rods must be provided with balls (prior art) in many different lengths (see Sheets 32 and 33 of the prior art document), a modular system can also hardly be implemented. However, this is possible with the two partial shells or half-shells because any standard screw length can be used in a simple manner.

A further disadvantage of the prior art consists in the installation of the ball studs in the plate. On page 35, for example, the brochure specifies installation by hammering. However, with the two partial shells or half-shells, a simple manual insertion is possible, and any suitable standard screw length can be used in a simple manner.

With plastic plates, the incorporated ball recess is reduced in diameter, and the plastic yields under the blows of a hammer and allows the one-piece ball to slip through the constriction.

One advantage of the two-shell construction of the ball consists in that the head can use a hexagon screw bolt and a spring can be installed which maintains tension after the parts to be joined (shells and plates) have slipped through. When the shells are made of polyamide (PA), they can generate tension through longitudinal and transverse arcs (bending). In case the foot should not come apart when the foot is lifted, it is ensured that the ball of half-shells is slightly smaller than the slip-through hole of the plate. After slipping through, the ball which has increased in size somewhat due to the spring tension engages behind the plate opening at two opposite sides and has a quasi-oval shape. When a plate itself is made of inflexible stainless steel, a nonmetallic part of pliant material of some kind can be dispensed with. If the foot is not to be lifted after assembly, the spring action can also be dispensed with.

According to a further development, the two partial shells or half-shells are aligned with one another and locked by bore hole/pin arrangements.

Accordingly, it is advantageous and an embodiment form of the invention when the adjusting foot is configured in such a way that the half-shells are pressed apart by spring action.

As mentioned, the spring action can be generated by a helical compression spring, but alternatively also by a tension-generating shape of the material of the ball or plate, particularly when the base plate is made of plastic such as PA and the receiving space narrows in diameter in direction of the floor surface.

It is particularly advantageous when the two partial shells or shell halves are constructed identically. The one side of the shell half could be a locking strip and the other side of the shell half could be a recess for receiving the locking strip of the other shell half.

However, the partial shells can also be different, e.g., can make up one quarter and three quarters of the ball.

According to another embodiment form, the shell halves or parts can have rotating wings for adjusting the height by turning manually.

Alternatively, the shell halves or parts can have a wrench opening SW for adjusting under load by means of a tool.

It may also be advantageous for stabilizing to configure the base surface of the base plate with circumferential ribs.

The downwardly directed, collective spherical surface of the shell halves can be stepped to minimize the pushing-up forces.

For the same reason, it can be advantageous when the spherical surface formed by the half-shells has a circumferential recess below the center line of the ball for reducing pushing-up forces.

BRIEF DESCRIPTION OF THE DRAWINGS

FIG. 5C shows a perspective view of the same embodiment form.

FIG. 5D shows an exploded view of the same embodiment form.

FIG. 6A shows an exploded view of the screw bolt with hexagon head and the two ball halves.

FIG. 6B shows the arrangement from FIG. 6A in assembled position.

FIG. 7A shows an embodiment form with elastic plastic as component for the ball halves.

FIG. 7B shows the associated foot with its receiving space.

FIG. 8A shows an axial view of a further embodiment form of the ball.

FIG. 8B shows a top view of the arrangement from FIG. 8A.

FIG. 8C shows a top view of the associated shell half.

FIG. 9A shows the axial view of yet another embodiment form.

FIG. 9B shows a top view of the arrangement of FIG. 9A.

FIG. 9C shows a view of the associated threaded rod with head which can be spread apart.

FIG. 9D shows the associated metal half.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1A:
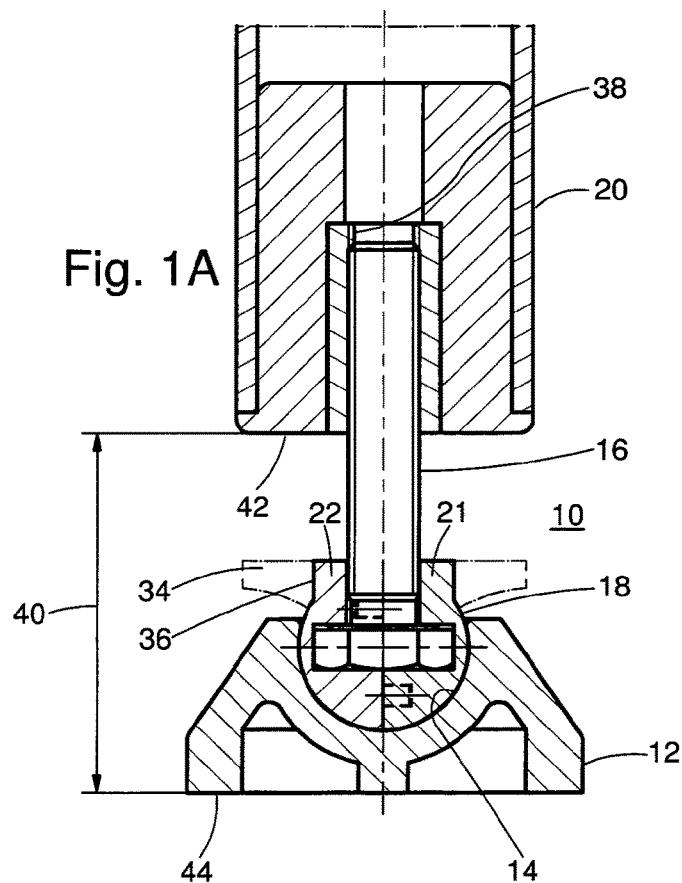
FIG. 1A shows an axial sectional view through an articulated adjusting foot according to the invention which adjustably supports a leg or the underside of a machine or a device on the floor and allows an adjustment of height.

FIG. 1A shows an articulated adjusting foot 10 according to the invention comprising a base plate 12 which has a receiving space 14 on the side remote of the floor and which has the geometry of a partial ball, preferably with dimensions slightly exceeding a hemisphere, further having a threaded rod 16 which has at its one end a partial ball 18 which can be inserted into the receiving space. The partial ball 18 of the threaded rod 16 appreciably exceeds the geometry of the partial ball of the receiving space. The other end of the threaded rod 16 is screwed into the end of a stand leg 20 which may be part of a machine or a device and supports the latter.

Figure 2A:
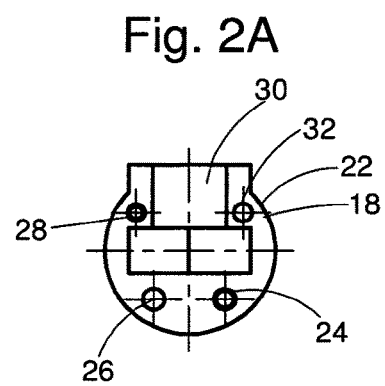
FIG. 2A shows the side view of the half-shell of a component part serving to form the ball.
Figure 1B:
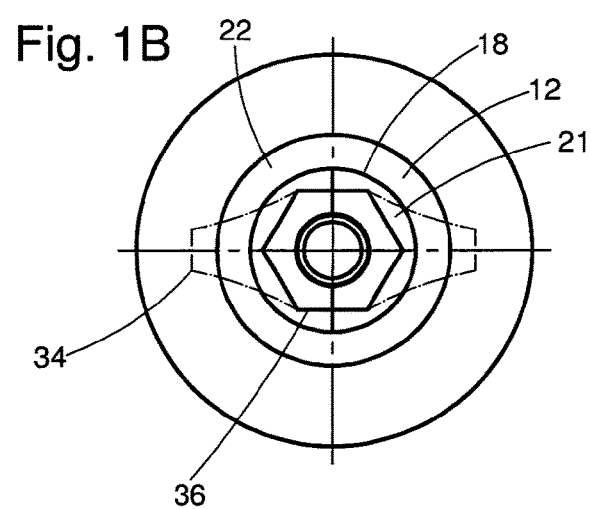
FIG. 1B shows a top view of the articulated adjusting foot from FIG. 1A.
Figure 2B:
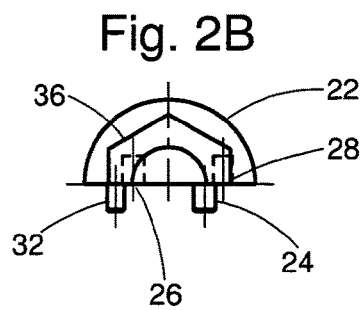
FIG. 2B shows a front view seen from above according to FIG. 2A.

FIG. 2A shows a front view of a shell half 23, and FIG. 2B is a top view of the shell half 22. The two half-shells 21, 22 are received by pin arrangements 32, 24 in corresponding bore holes 26, 28 of the other respective half-shell 22, 21. The pins and the bore holes are advisably aligned such that the two halves are identically constructed.

The two half-shells 21, 22 form a cavity 30. The two shell halves 21, 22 can form a hexagon projection 36 or a wing projection 34 on the outside in order to turn the threaded rod 16 in a thread 38 arranged in the leg 20 or in the underside 42 of the device in order to adjust the distance 40 between the underside 42 of the device and the supporting surface (floor) 44 to compensate for unevenness in the floor. The wings 34 are used for rotating the threaded rod 16 manually when the loading of the foot remains limited, while a tool such as an open ended wrench is used to rotate the hexagon 36 in arrangements which are difficult to move.

In the embodiment form in FIGS. 1A, 1B and 2A, 2B, respectively, the material of the foot 10 and of the ball 18 is elastic, i.e., comprises PA (polyamide), so that the ball can be pressed into the cavity 14.

In the embodiment form according to FIG. 6A and FIG. 6B, the foot 112 in the embodiment form shown in FIG. 6A is produced from hard material such as metal (see FIGS. 6A, 6B, 7A and 7B) and the receiving space narrows in diameter in direction away from the floor surface (FIG. 6B) and a washer 46 is pressed in in the region of the edge of the receiving space 114 of the base plate, and the inner diameter of the washer 46 allows the half-shells 122, 222 which are pressed together to be inserted. To this end, the half-shells 122, 222 are pressed apart through spring action, and the spring action according to FIG. 6A is produced by a helical spring 48 which can be arranged in the recesses 50 in the half-shells 122.

If a certain elasticity is imparted to the material of the half-shells 222 of the ball (FIG. 7A), a spring action can also be generated by shaping.

When passing through the constriction formed, for example, by the ring 46, the gap 52 closes owing to the elasticity of the material of the half-shells 222.

In the embodiment form according to FIG. 6A, the half-shells 122 can also be made of metal, in which case manual assembly is also possible due to the installed spring 48, whereas in the arrangement according to FIG. 7A the elastic half-shell made of polyamide (PA) generates tension because of tension-generating bending.

In the embodiment form according to FIG. 7B, metal plates 112 with pressed-in washer 46 can be used, wherein the inner diameter of the inside opening of the washer 46 is smaller than that of the expanded ball 122.

FIGS. 8A and 8B or 8C show a further embodiment form which works with a pin 124 which is formed by wings 134 and which locks the two halves of the ball in that the pin 134 extends into a bore 124 of the other respective wing 134. The wings 134 further form a stop 55 for the tilting movement.

FIGS. 9A to 9D show a further embodiment form in which an additional recess 54 minimizes the pushing-up forces caused by the pressure of the ball 318 on the foot plate 312. This applies correspondingly when steps 56 are arranged on the ball surface.

An additional recess 54 extending circumferentially below the center line 58 likewise reduces the pushing-up forces which act on the plate 312.

Here also, rotating wings 334 serve for manual adjustment, and wrench opening SW serves for adjustment under load by means of tools. The two shell halves 316 are identically constructed in this embodiment form, also. Minimizing the pushing-up force permits smaller foot plates while retaining the same strength and accordingly economizes on material.

A nut 54 also serves to stabilize.

Figure 3:
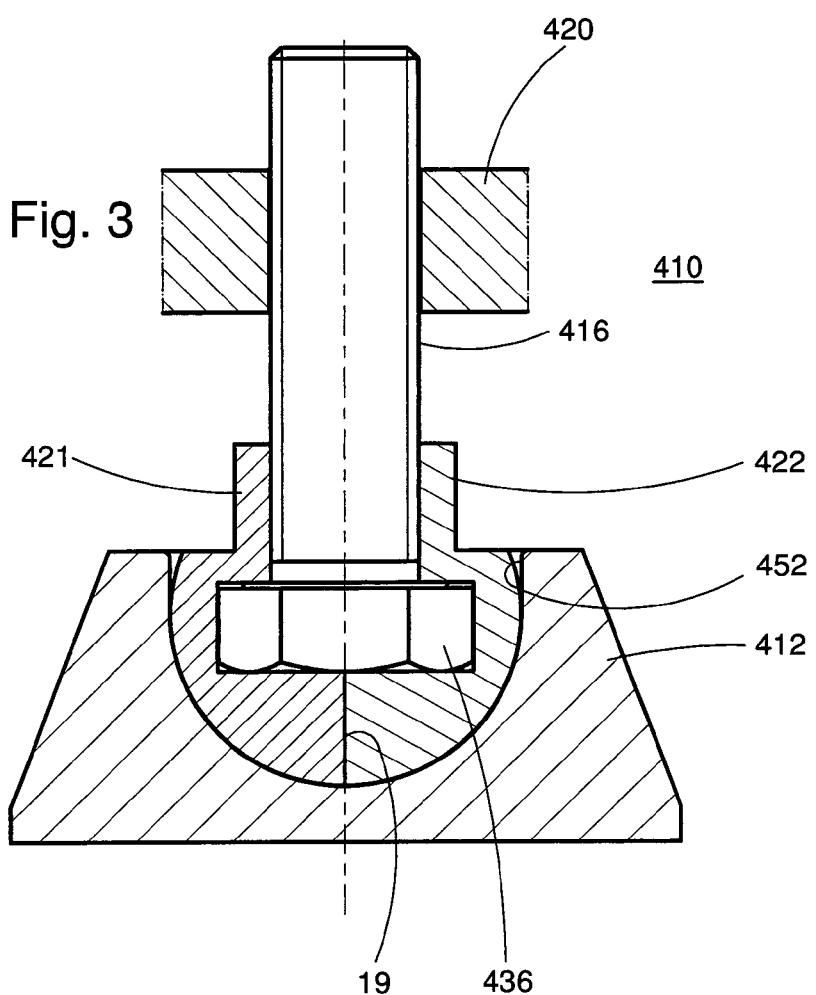
FIG. 3 shows a sectional side view of a foot without spring tension.
Figure 4:
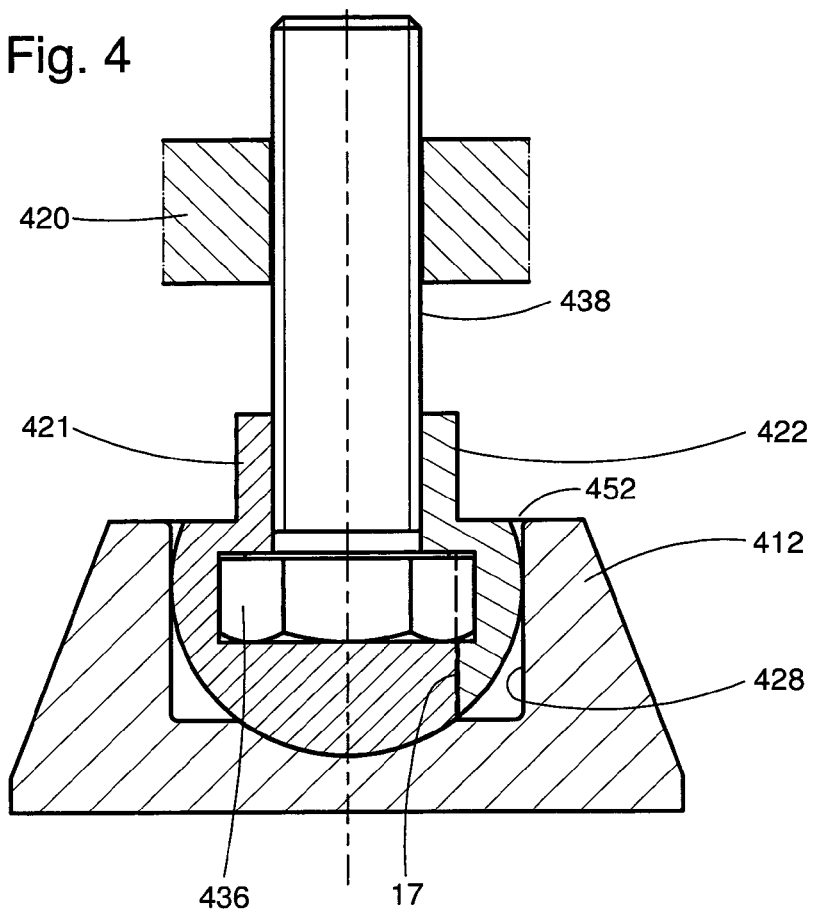
FIG. 4 shows a view similar to FIG. 3, but with different ball parts.

While the preceding embodiment forms work with a spring action particularly to prevent separation of the foot by the force of gravity when lifting the foot 10, there are cases of application where it is not important to provide this characteristic, such as in embodiment forms shown in FIGS. 3 and 4.

The two embodiment forms in FIG. 3 and FIG. 4 differ with respect to the separation line between the two partial balls, wherein partial ball 421 is identical to partial ball 422. In FIG. 4, the separation line 19 shifts to the right so that partial ball 422 makes up only one quarter of partial ball 421. The separation 417 according to FIG. 4 must be positioned in such a way that it is still possible to insert the head 436 of the screw laterally into the cavity of the partial ball. The embodiment forms in FIGS. 3, 4 and 5A and 5B show that the receiving space for the ball parts forms a recess, or rather a gap 452, so that the assembled foot can emerge from the cavity 428 when the supported object 42 is lifted. In various cases of application, however, this is not a disadvantage but rather allows feet to be exchanged.

In the embodiment forms in FIGS. 3 and 4, the cavity in which the ball parts can be inserted is outfitted only at the underside with a spherical surface in which the ball is surrounded and supported by a screw head.

Figure 5A:
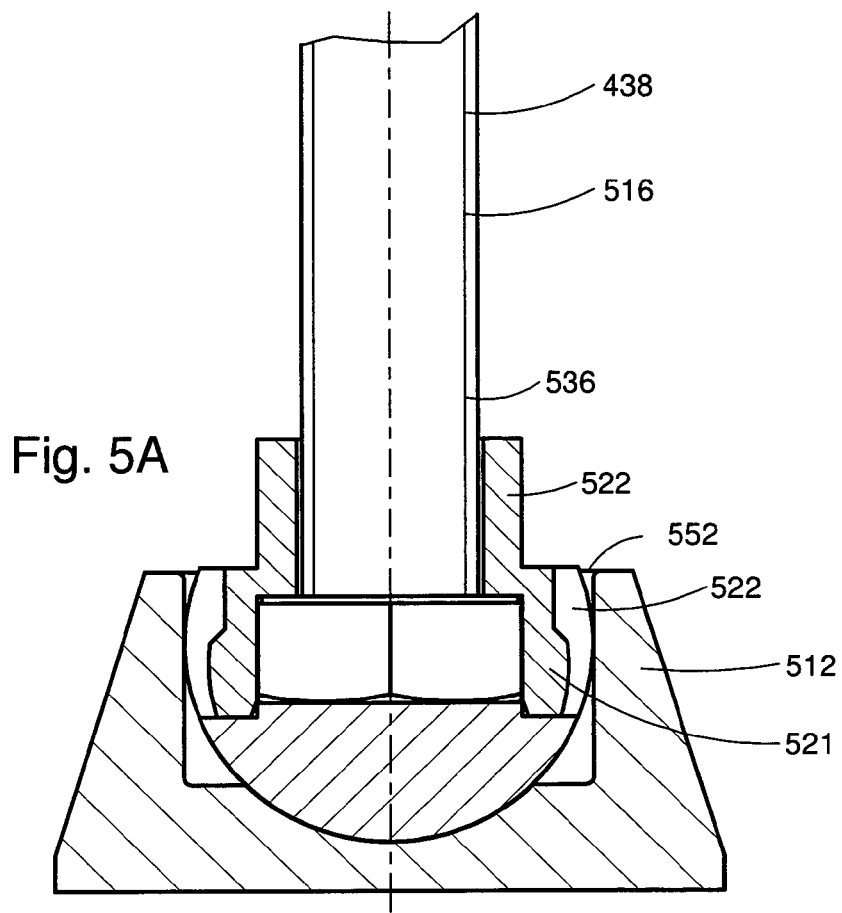
FIG. 5A shows an axial sectional view of a further embodiment form.
Figure 5B:
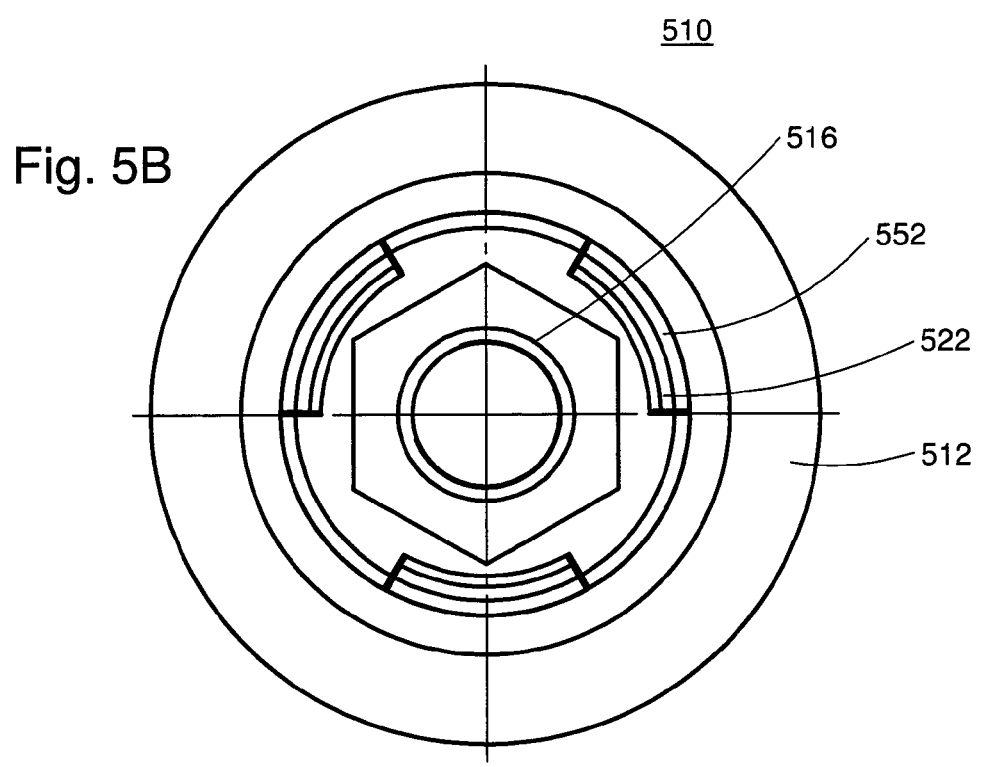
FIG. 5B shows a top view of the same embodiment form.

In the embodiment form according to FIG. 5B, the partial balls are formed by six tongues 521, 522 which engage one inside the other like fingers.

In FIGS. 5C, 5D, the screw heads are inserted from the top and not from the side as in FIG. 3.

COMMERCIAL APPLICABILITY

The invention is commercially applicable in switch cabinet construction.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

LIST OF REFERENCE NUMERALS

10, 110, 310, 410, 510 adjusting foot
12, 112, 312, 412, 512 base plate
14, 114, 314 receiving space
16, 116, 316, 416, 516 threaded rod
17 separation line, separation plane
18, 318, 518 partial ball
19 separation line or separation plane
20, 420 stand leg
21, 121, 321, 421, 521 shell halves, partial shell
22, 122, 222, 322, 422, 522 shell halves, partial shell
24, 124, 324, 424 pin
26, 326 pin, projection
28 bore hole
30, 330 cavity
32, 332 bore, countersink
34, 134, 334 wing
36, 336, 436, 536 hexagon, head threaded rod
38, 438 thread
40 distance
42 underside of device
44 supporting surface, floor
46 washer
48, 348 helical compression spring
50 receptacle for compression spring
52, 152, 352, 452, 552 gap
54, 554 lock nut
55 stop face
56 circumferential steps
58 circumferential step
60 bore hole

The invention claimed is:

1. An articulated adjusting foot comprising:
    a base plate that has:
        a floor surface; and
        a receiving space on a side of the plate remote of the floor surface, the receiving space having a geometry of a partial ball;
    a threaded rod that has at one end a partial ball that can be inserted into the receiving space;
    wherein the partial ball of the threaded rod is configured to fit in the receiving space;
    wherein the threaded rod is a screw bolt with a hexagon bolt head;
    wherein the partial ball of the threaded rod is formed of two parts that are configured to enclose the hexagon bolt head in a torsionally rigid manner, with at least one of the two parts being configured to be inserted one into the other of the two parts; and
    wherein a geometry of the partial ball of the threaded rod in an axial direction of the threaded rod exceeds the geometry of the receiving space in the axial direction of the threaded rod when the partial ball of the threaded rod is fitted into the receiving space.

2. The articulated adjusting foot according to claim 1;
    wherein the two parts are configured to align with one another and lock together by pins or by the hexagonal bolt head.

3. The articulated adjusting foot according to claim 2;
    wherein the two parts are constructed identically to each other.

4. The articulated adjusting foot according to claim 3;
    wherein one side of each of the two parts has a locking strip; and
    wherein an other side of each of the two parts has a recess configured to receive the locking strip of the other of the two parts.

5. The articulated adjusting foot according to claim 3;
    wherein the two parts have a wrench opening for adjusting under load by means of a tool.

6. The articulated adjusting foot according to claim 2;
    wherein the floor surface of the base plate has circumferential ribs.

7. The articulated adjusting foot according to claim 2;
    wherein a downwardly directed spherical surface of each of the two parts is stepped to minimize pushing-up forces.

8. The articulated adjusting foot according to claim 2;
    wherein a spherical surface formed by the two parts has a circumferential recess below a center line to reduce pushing-up forces.

9. The articulated adjusting foot according to claim 2;
    wherein the two parts are constructed differently from each other.

10. The articulated adjusting foot according to claim 1, further comprising:

a spring;
wherein the two parts are configured to press against one or more walls of the receiving space by the spring in the receiving space when the partial ball of the threaded rod is fitted in the receiving space.

11. The articulated adjusting foot according to claim 10; wherein the spring comprises at least three angularly distributed leaf springs that engage one inside the other and surround the hexagonal bolt head.

12. The articulated adjusting foot according to claim 10; wherein the spring comprises a tension-generating shape of a material of the two parts.

13. The articulated adjusting foot according to claim 10; wherein the base plate comprises a plastic; and wherein the receiving space has a diameter that narrows in a direction toward the floor surface.

14. The articulated adjusting foot according to claim 10, further comprising:
a washer that is configured to be pressed in in a region of an edge of the receiving space of the base plate;
wherein the base plate comprises metal; and
wherein an inner hole of the washer is configured to receive the two parts when the two parts are pressed together.

15. The articulated adjusting foot according to claim 1; wherein the geometry of the partial ball of the threaded rod exceeds that of the receiving space.

16. The articulated adjusting foot according to claim 1; wherein each of the two parts has at least one wing; and wherein the partial ball of the threaded rod is configured to rotate within the receiving space when a force is applied to at least one of the wings in a direction perpendicular to the axial direction of the threaded rod.

* * * * *